United States Patent [19]
Chiang

[11] Patent Number: 5,369,526
[45] Date of Patent: Nov. 29, 1994

[54] ANTIBOW DEVICE FOR LASERS
[75] Inventor: Tom J. Chiang, Berwyn, Pa.
[73] Assignee: Holo Image Technology, Inc., Langhorne, Pa.
[21] Appl. No.: 882,879
[22] Filed: May 14, 1992
[51] Int. Cl.$^5$ .......................... G02B 5/04; G02B 5/32; G02B 26/08; G06K 7/10
[52] U.S. Cl. ..................................... 359/615; 359/17; 359/209; 359/566; 359/831; 235/457
[58] Field of Search .......... 359/15, 16, 17, 18, 359/206, 209, 558, 566, 197; 235/457

[56] References Cited
U.S. PATENT DOCUMENTS 4,707,055 11/1987 Stark ......................................... 359/18
4,973,112 11/1990 Kramer ..................................... 359/17
5,046,794 9/1991 Ritter et al. ............................ 359/566

Primary Examiner—Loha Ben
Assistant Examiner—John Juba, Jr.
Attorney, Agent, or Firm—Eugene E. Renz, Jr.

[57] ABSTRACT

A device for use in a system of hologon deflection of a laser beam having a wavelength $\lambda$ at a rotating angle $\theta_R$ to produce a scan line. The device comprises a prism having a grating on at least one surface. The prism is positioned to deflect the scan line after hologon deflection of the laser beam. The prism has an apex angle between scan line intersecting surfaces of $\theta_\alpha$. The grating has a grating spacing D. Deflection of the scan line by the angle $\theta_\alpha$ is designed so that it is equal to the deflection of the scan line by the grating. This produces a scan line having bow of less than 1/600 of the bow of the scan line without the prism and effectively eliminates wobble. The range for the apex angle $\theta_\alpha$ may be from about 1° to about 30°, and preferably from about 2° to about 6°. The grating spacing ranges from about 0.0001 to about 0.001 millimeter.

7 Claims, 4 Drawing Sheets

ANTIBOW DEVICE FOR LASERS

FIELD OF THE INVENTION

The present invention relates to a device for substantially improving bow and reducing wobble in line scans produced in hologon systems and the like. More particularly, the invention relates to a device for substantially reducing bow and wobble in line scans from systems in which a laser beam is deflected by a rotating diffraction grating optical element to thereby holographically form the line scan.

BACKGROUND OF THE INVENTION

The use of plane linear diffraction gratings on rotating spinners as optical scanners has become an important technology in several industries, such as laser printers and the like. One form of such scanning devices are known in the industry as holographic spinner devices, and are disclosed in Ih U.S. Pat. No. 3,953,105. In this device, a source of coherent radiation is directed at a surface which is being rotated about an axis such that the radiation is redirected to a focal point locus.

Early on it was recognized that the basic simplicity of a rotating hologram scanner brought with it inherent disadvantages, particularly in the failure to produce truly straight line scans. Heiling U.S. Pat. No. 4,094,576 discloses the use of a lens system to remedy the problems incurred with the use of a strongly curved object surface. Heiling uses a reconstructed wave using a planar reference wave and a spherical wave modified by a cylindrical lens. Goshima U.S. Pat. No. 4,121,883 discloses a scanning device with various optical devices in the path of the beam between the rotating member and the final focal point locus.

Kay U.S. Pat. No. 4,428,643 disclosed the use of a diffraction grating in the optical path of a spot scanning holographic spinner system to provide compensation for wavelength shifts in the laser. The diffraction grating has the same properties as do the gratings formed on the spinner surface. This patent defines certain problems which result from the geometry of holographic scanners using a rotating disc having a plurality of holographically formed lenses or gratings. Identified as problems from these devices are scan line "bow", spinner wobble and spinner "wedge". A relationship between wavelength of the reconstructed light source, the grating period and the angles of incidence and diffraction is discussed, as this patent is directed at the need to compensate for wavelength shifts in the coherent light source.

Referenced in the above discussed Kay patent is the disclosure which has become Kramer U.S. Pat. No. 4,289,371. This basic patent discloses the use of a scanning system in which a reconstruction beam is directed in non-normal incidence against a spinner surface having formed therein at least one plane linear diffraction grating. The grating is constructed such that it conforms to a ratio of the wavelength of the reconstruction beam to the grating period ($\lambda_r/d$) of between 1 and 1.618. As the spinner is rotated about an axis of rotation, the device generates a wavefront or scan line which is focused with the use of other optical elements on an imaging plane.

Kramer U.S. Pat. No. 4,289,371 suggests that such a system produces line scans at a plane which are almost completely bow free and are invariant with respect to any irregularities such as wobble on the surfaces of the spinner. Minimization of bow is described with extensive mathematical analysis and it is disclosed that satisfactory results are achieved. A bow of 0.0016 inch (theoretical data only) is shown in FIG. 10 and is stated to be more than acceptable for most high resolution scanning applications. Actual experimental values are shown in FIG. 11, resulting in bow of as much as between 0.003 and 0.004 inch.

The above discussed patent does not solve all of the bow problems of spot scanning hologon spinner systems. Kramer U.S. Pat. No. 4,583,816 acknowledges that scan line bow is still a problem to be solved and proposes to solve that problem by an improved system. The new Kramer system suggests that bow can be corrected by tilting the lens which is usually employed in cooperation with the hologon deflector to produce the scanning spot. This geometric embodiment places the optical axis of the lens in an axis which is not coaxial with the diffracted beam but is, instead, at an angle with the path of the diffracted beam. The angle is suggested to be sufficient to bend the scanning line in a sense opposite to the bow in the line which has been produced by the hologon deflector, as long as there is distortion in the focusing lens.

It is not clear from this Kramer patent whether the deviation from straightness disclosed is theoretical or empirical, as the curves are smooth and no actual data is discussed. However, it can be seen in FIG. 5 that different degrees of bow are experienced over different field positions with different degrees of lens tilt. Bow seems to be optimized at a tilt of $-8.5°$ shown by curve No. 1, as both curves 2 and 3 have what appear to be greater bow at $-8.0°$ and $-9.0°$ respectively. In any event, the system requires the use of a tilted distortion containing focusing lens which may or may not be desirable in all applications and which is definitely expensive in any event.

This Kramer patent does not disclose that either barrel distortion or pincushion distortion do not have other inherent limitations which prevent the system from functioning as intended. It is also noted that the system shown requires a relatively precise alignment of the angle of the lens tilt with respect to the axis of the scan line. The Figures suggest that some variation in tilt angle results in less effective bow correction. The advantages of the system are stated to be that the previously needed equal angles of incidence and diffraction and the like set forth in Kramer U.S. Patent No. 4,289,371 are not needed with the tilted lens feature. The tilted lens system allows for use of other ratios of $\lambda_r/d$ and other incident angles, to provide freedom for the design of the hologon scanner. Nowhere is it stated that results are obtained which are better than the theoretical 0.0016 inch.

Finally, additional improvements in hologon deflector systems are disclosed in Kramer U.S. Pat. No. 4,973,112. The principal feature of this Kramer patent is to employ dispersive optical elements such as gratings and prisms to correct for deviations from straightness in the scan line which are caused by the inherent bowing of the scan line by rotating hologon deflector discs. Other errors and problems in the system are also corrected by the newest Kramer patent system.

In Kramer U.S. Pat. No. 4,973,112, several embodiments are disclosed which are suggested to solve several different problems. Bow is reduced by an auxiliary plane grating placed in the path of the scan beam exiting the hologon. The grating lines in the auxiliary grating are parallel to the hologon facet grating lines for the hologon corresponding to the center of scan to produce a diffracted, deflected beam. In discussing the effect of the auxiliary grating on bow, Kramer suggests that a scan line bow is produced by the hologon because the geometric relationship of the grating lines and the scan beam changes as the hologon rotates. The auxiliary grating element bows the scan line as well, Kramer suggests, because the incident beam changes its angular orientation with respect to the normal to the grating surface as it scans across the surface. Thus it is suggested that when the auxiliary grating is tilted with respect to the plane in which the plane grating hologon rotates, significant scan line bow correction is achieved.

Another system is disclosed in Kramer U.S. Pat. No. 4,973,112, in FIG. 2, in which an auxiliary plane grating is used in combination with a prism which is designed to magnify the scan beam bow produced by the hologon. Thus the auxiliary plane grating compensates for both the bow caused by the hologon rotation and also for the bow which is magnified by the prism. The function of the prism, therefore, is not to correct bow but rather to eliminate or reduce an ellipticity problem as described in the discussion relating to FIG. 2. Unfortunately, there is nothing in this reference which specifically shows how much bow has been reduced quantitatively beyond that which has been already shown in the art. In point of fact, there is no reason to expect that any improvement in bow reduction is found since all of the calculations are theoretical and are not based upon experimental results.

One particular application of this technology is in systems wherein the laser beam is being applied to the internal surface of a drum, such as in a laser printer or copier or the like. There is no system presently available in which the entire series of elements rotate together as a unit, where the ideal locus of point image would be a perfect circle. Wobble, or scanner rotation in the y-z plane prevents an effective design at the present time.

Accordingly, it is an object of this invention to provide a device for minimizing bow in scan beams produced by hologons and the like.

Similarly, it is an object of this invention to provide a device for minimizing wobble in scan beams produced by hologons and the like.

Another object of this invention is to provide a device for substantially eliminating bow as described by at least an order of magnitude over a system without such a device.

Similarly again, another object of this invention is to provide a device for substantially eliminating wobble by at least an order of magnitude over a system without such a device.

Yet another object of the present invention is to provide a bow reducing device which does not depend on lenses which have distortion and which are tilted at an angle with respect to the path of the scan beam.

Still another object of the present invention is to provide a device which is simple to use in hologon systems and which is effective over wide ranges of laser wavelengths and hologon grating distances.

Other objects will appear hereinafter.

SUMMARY OF THE INVENTION

A device for use in a system of hologon deflection of a laser beam having a wavelength $\lambda$ at a rotating angle $\theta_R$ to produce a scan line. The device comprises a prism having a grating on at least one surface. The prism is positioned to deflect the scan line after hologon deflection of the laser beam. The prism has an apex angle $\theta_a$ between scan line intersecting surfaces. The grating has a grating spacing D. Deflection of the scan line by the prism is designed so that is the equal and opposite to the deflection of the scan line by the grating caused by spacing D. This combination produces a scan line having bow of less than 1/600 of the bow of the scan line without the prism and effectively eliminates wobble. The ranges for the apex angle $\theta_a$ may be from about 1° to about 30°, and preferably from about 2° to about 6°. The grating spacing ranges from about 0.0001 to about 0.001 millimeters. Such a device is extremely useful in systems using laser printers and also in systems where scan error is a problem.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
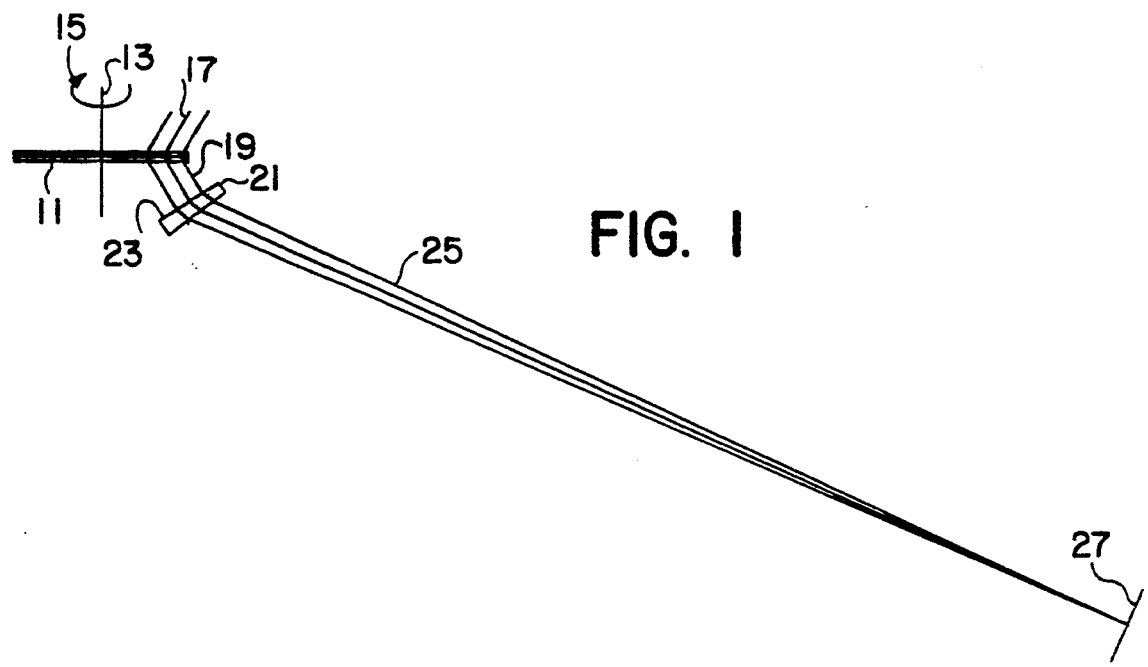
FIG. 1 is a schematic diagram illustrating the device of the present invention in a hologon system which has produced a scan line.

As shown in the drawings, the invention comprises the use of an optical device in the path of a hologon system to produce a scan line of unexpectedly improved quality. Specifically, FIG. 1 schematically shows the use of the device of this invention in a hologon system in which a laser beam is deflected by a rotation diffraction grating optical element to thereby holographically form the line scan. The bow and wobble of the scan line are essentially eliminated.

In FIG. 1, the rotating grating 11 rotates about axis 13 in the direction of arrow 15. Laser beam light 17 is directed on grating 11 and is deflected by grating 11 to produce a deflection beam 19. In prior art systems, beam 19 is then focused on a surface in the normal manner. In FIG. 1, deflected beam 19 passes through prism 21 which has grating 23 on one of the surfaces which are acting on beam 19. Beam 19 is further deflected by the prism 21 and grating 23 to produce a scan line 25. Scan line 25 is focused on imaging plane 27 and, as shown below, has surprisingly less bow than uncorrected beam 19.

Figure 2:
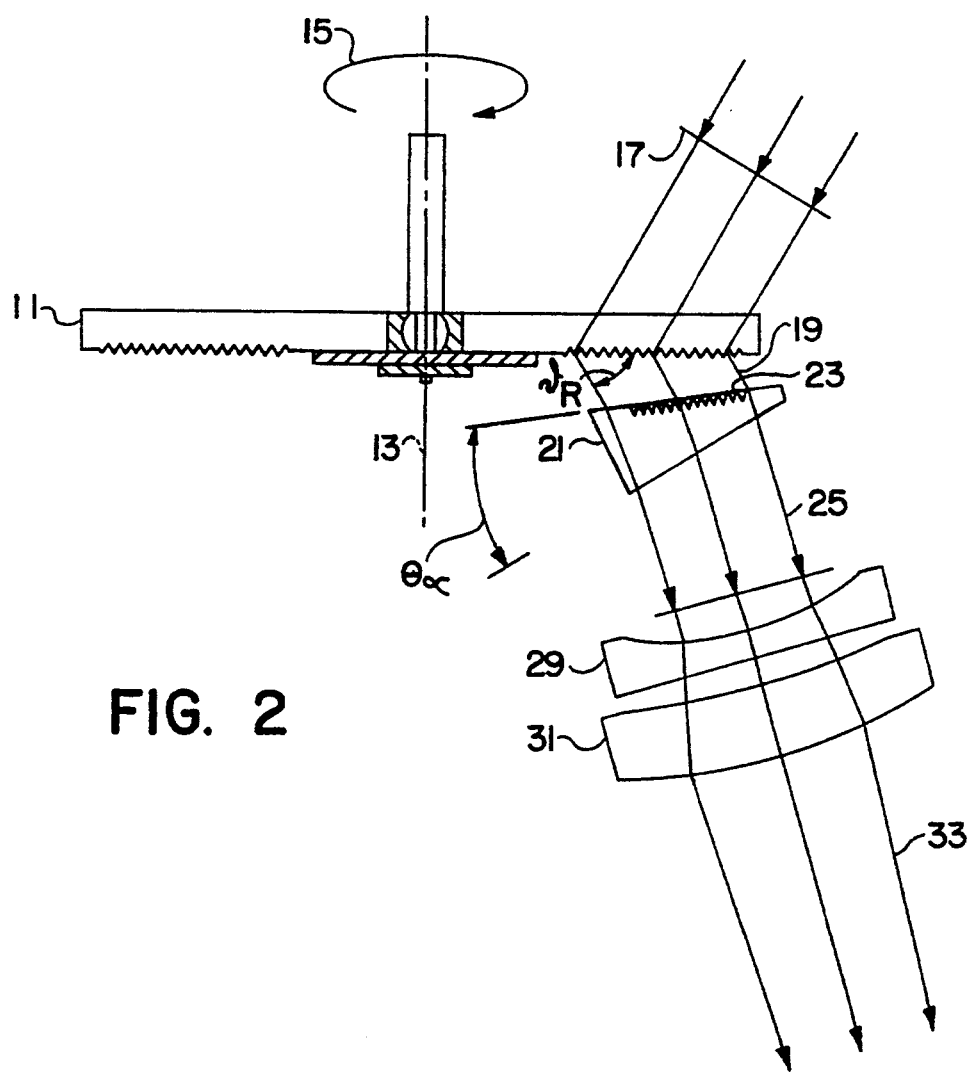
FIG. 2 is a more detailed diagram of the system of FIG. 1, in which the operating components of the hologon system are illustrated in more detail in relation to the specific features of the device of this invention.

FIG. 2 shows the system of FIG. 1 in greater detail and slightly enlarged for clarity. Laser light 17 is, of course, split, collimated, spatially filtered and the like prior to incidence on grating 11 which produces a diffracted wavefront 19 as it rotates about axis 13. Diffracted beam 19 next passes through a corrective grating 23 which is shown on the incident surface of prism 21. It is to be appreciated that grating 23 can also be placed on the exiting face of prism 21.

Prism 21 is shown as a wedge prism which has an apex angle $\theta_\alpha$ between the two scan line intersecting surfaces. The prism produces a scan line having bow of less that 1/600 of the bow of the scan line without the prism and effectively eliminates wobble. The range for the apex angle $\theta_{60}$ may be from about 1° to about 30°, and preferably from about 2° to about 6°. The grating spacing ranges from about 0.0001 to about 0.001 millimeters. The grating 23 has a grating spacing D which causes deflection of the scan line by the same amount but opposite direction to accomplish the objects of the present invention. The use of the grating spacing which is functionally the same as angle $\theta_\alpha$ causes the same deflection of the scan line by the grating 23 and by the prism 21.

The scan line 25 exits prism 21 and is focused by the focusing lenses 29 and 31 to direct a virtually bow free scan line 33 to the imaging plane for which the system is intended. The present device is extremely helpful in eliminating bow in devices such as laser printers and other imaging devices where high accuracy and essentially negligible bow in the scan lines is essential. Because of the reduced or substantially eliminated bow, geometric configurations are possible for the first time wherein the unique shape or size of the imaging device previously prevented use of hologon systems altogether. The device also operates effectively on the inside of a rotating cylinder or drum to produce substantially improved scan line operation.

In order to demonstrate the effectiveness and efficiency of the present invention, certain experiments were performed using the device shown in FIGS. 1 and 2. Prism 21 was a Schott BK7 glass prism having an apex angle $\theta_\alpha$ of 4.40°. The precise alignment of the prism 21 in these experiments placed the normal of the front surface of the prism 21 at an angle of 3.85° to the central ray 19 emerging from the rotating grating 11. As was shown in FIG. 2, these experiments were performed with the grating 23 on the incident face of prism 21. The compensating grating 23 had grating spacing of 0.0009783 millimeter.

The hologon scanning system in which the above describe device was used was conventional in design. The configuration consisted of a laser beam having a wavelength of 632.8 nm which is diffracted through a rotating multi-segmented plane grating sandwiched between two glass plates followed by two compensating prisms. The angle of incidence of the laser beam on the glass plates surrounding the grating was 30.5° incoming and 29.5° outgoing. The grating was sandwiched between two plane parallel glass plates of BK7 glass, with a thickness of 3.5 mm and an outside diameter of 120.65 mm. Line shape was straight and line spacing was 0.0006328 mm. Grating configuration comprised 5 equal segments of a circle, with a 50% duty cycle so that the beam is in active scan for 50% of the rotation. The distance from the center of the rotating disc to the center of the laser beam's intersection was 44.45 mm.

Figure 4:
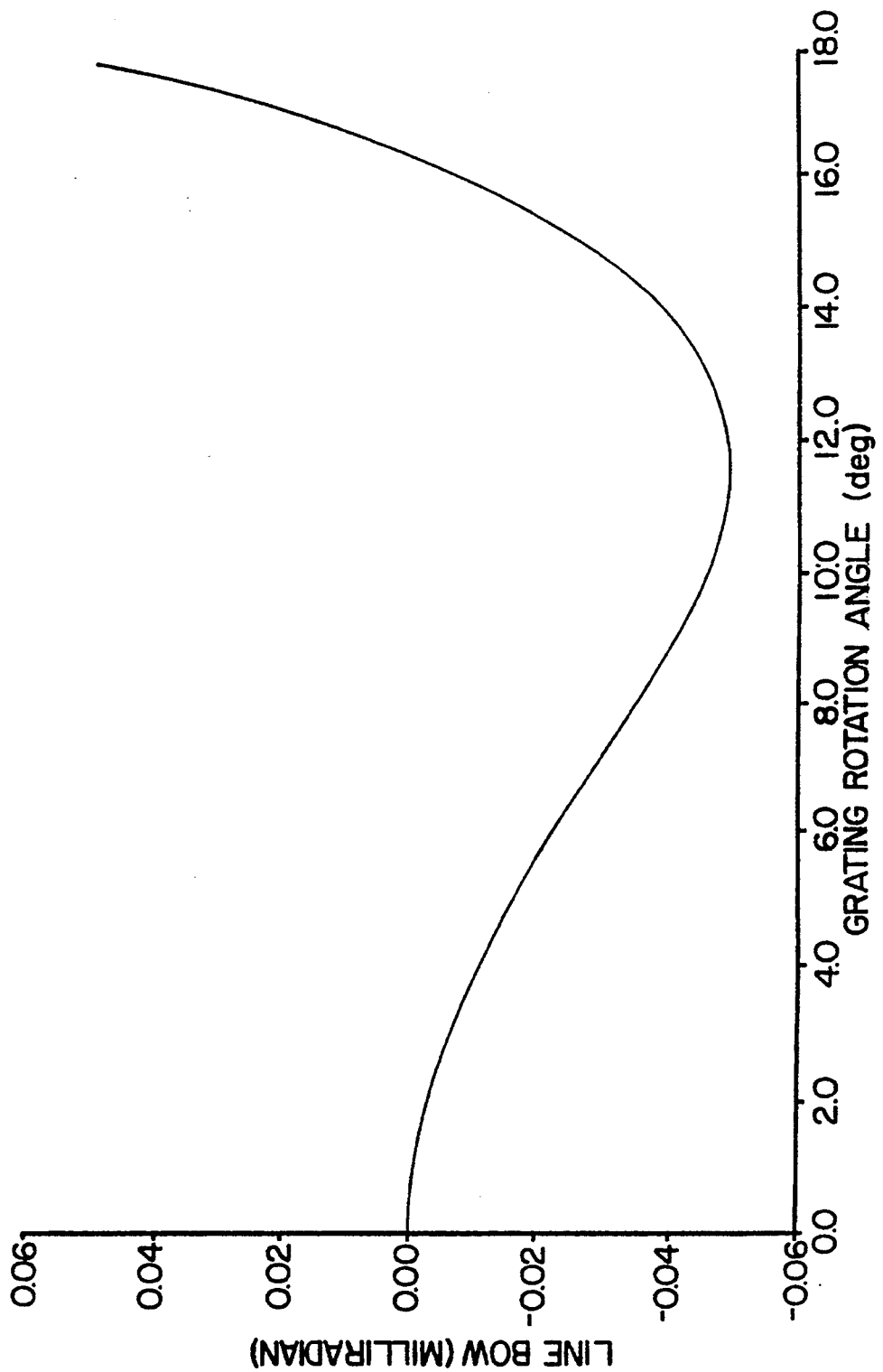
FIG. 4 is a graphical illustration showing a plot of the line bow versus scan angle for the full system.
Figure 5:
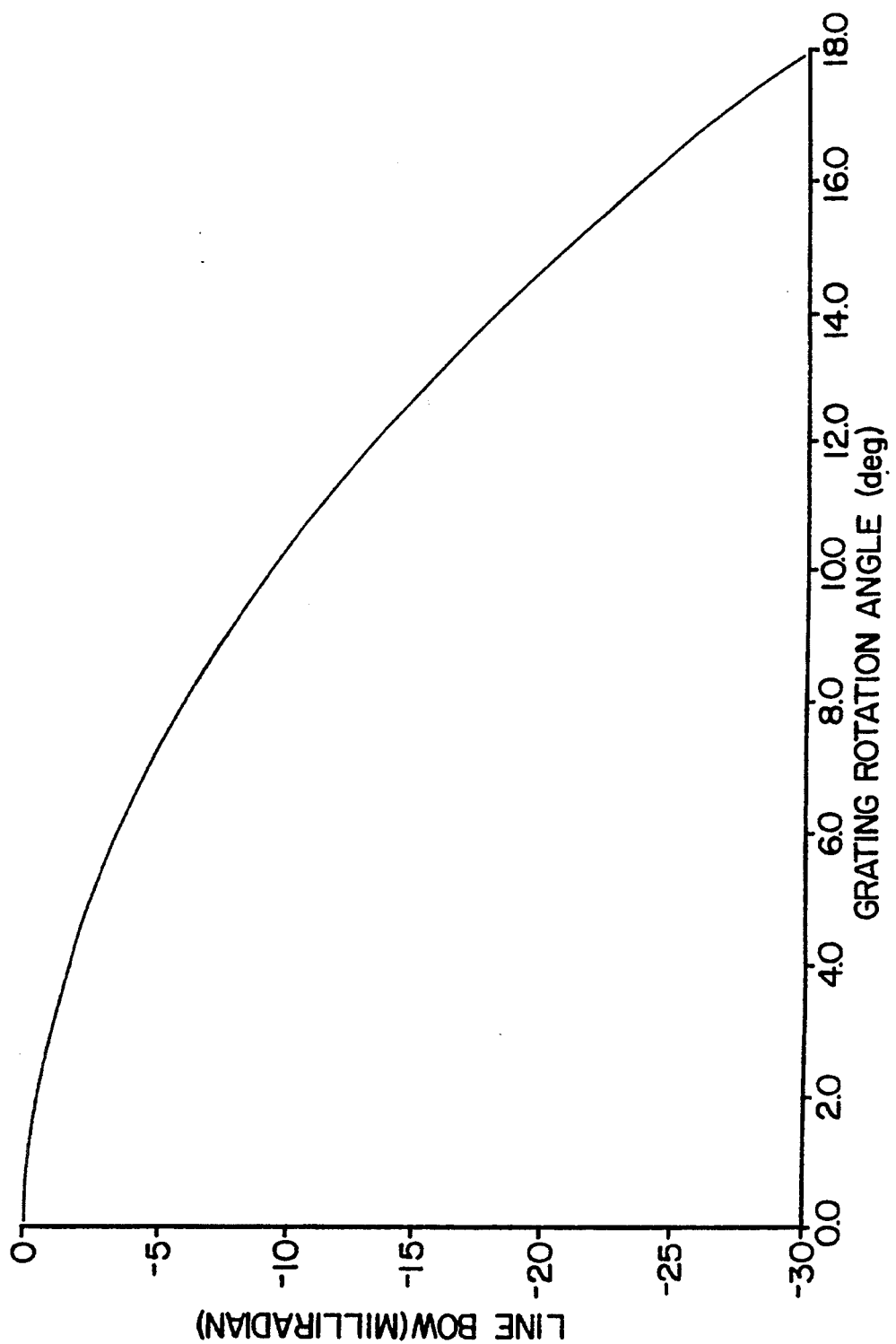
FIG. 5 is a graphical illustration showing a plot of line bow versus scan angle for the system without the compensating device of the present invention.

The results of these experiments are shown in FIGS. 4 and 5. In FIG. 4, a plot of line bow versus scan angle for the system is shown. The bow is ±0.048 milliradians. This value corresponds to ±34 microns for a 703 mm focal length focusing lens, which is the focal length which that produces an 18 inch scan line for this system. In contrast, FIG. 5 shows a plot of line bow versus scan angle for the system without prism 21 (and grating 23) in the path of the diffracted beam 19. As can be seen, the bow for the system without the device of this invention is 30 milliradians.

Thus, the device of the present invention reduced the bow from 30 milliradians to 0.048 milliradians, which is an improvement of a factor of 625. Moreover, this bow of just ±34 microns for an 18 inch scan line is orders of magnitude better than the scan line bow described in the previously discussed Kramer U.S. Pat. No. 4,289,371. As was noted in the above discussion, a bow of 0.0016 inches (theoretical data only) is shown in FIG. 10 of Kramer and is stated to be more than acceptable for most high resolution scanning applications. Actual experimental values are shown in FIG. 11 of that U.S. Pat. No. 4,289,371, resulting in bow of as much as between 0.003 and 0.004 inches. While the comparison is not direct because different systems are employed, clearly the present invention is capable of producing much superior results over the prior art.

Another experiment was performed to determine the contribution of bow elimination by the two elements forming the device of this invention. When only a grate compensation was used, the bow was reduced from 30 milliradians to 4.4 milliradians, or a factor of 6.8. This would correspond to the system shown in Kramer U.S. Pat. No. 4,973,112, and does not compare in improvement to 0.048 milliradians. In terms of improvement, the present invention shows an improvement of 625 compared to 6.8 of the prior art, an order of magnitude better.

Figure 3:
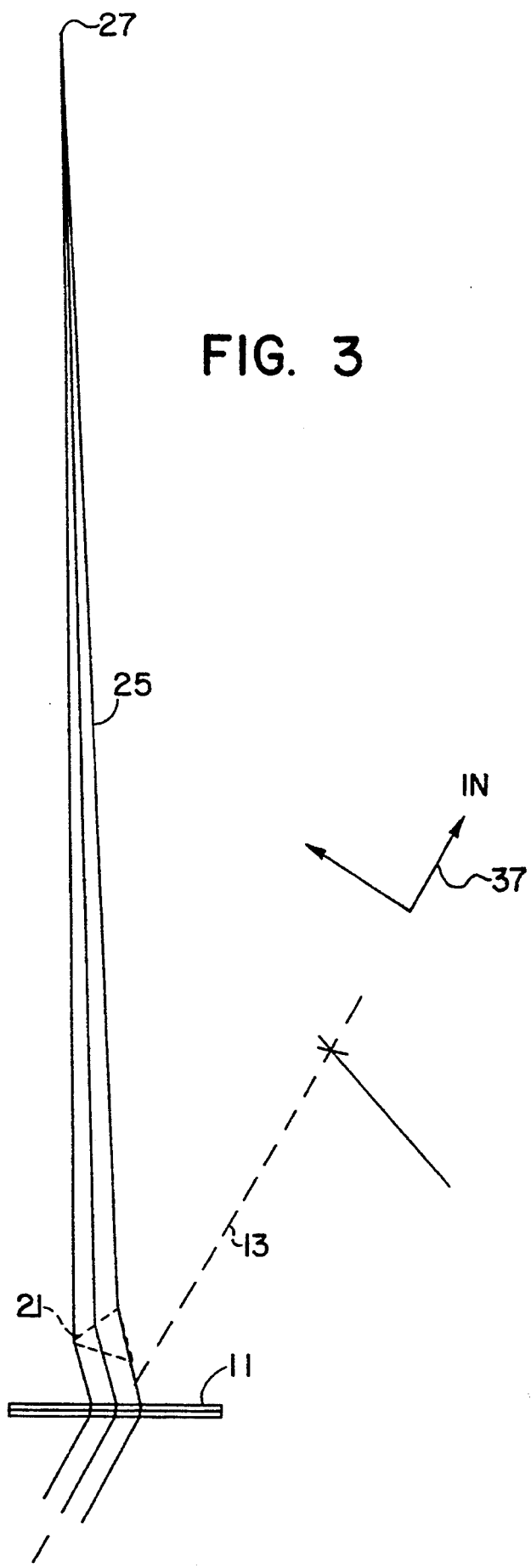
FIG. 3 is a schematic diagram illustrating a device similar to that of FIG. 1, but shown in an arrangement for use on the inside of a rotating element such as a rotating drum in which a scan line produces a perfect circle pattern.

The apparatus shown in FIG. 3 was also evaluated to determine the effects of the present invention on wobble. In FIG. 3, the axis of rotation 13, defined for geometric purposes as the x axis, is the axis of rotation for the entire system. Rotating grating 11 and prism 21 function in the same manner as in FIG. 1, with the exception that they rotate together around axis of rotation 13 to produce a scan line 25 which defines a circle on imaging plane 27. To the extent that there is any rotation of axis 13 in the y-z plane 37, wobble is produced and the circle in imaging plane 27 is not true.

The design in FIG. 3 was evaluated to demonstrate the surprising improvement obtained by the present invention. Specifically, a radial image motion of ±0.000061 millimeters at the image plane was produced. The system of the present invention compensated for a wobble of ±0.05° or 180 arc-seconds. For the focusing lens with EFL of 703 mm, this corresponded to a beam angle variation of ±0.018 arc-seconds after the beam passed the grating and prism as described above.

The combination of the present invention produces remarkably improved results which are truly unexpected. In the system just described for FIG. 3, for example, if neither the grating nor the prism had been used, the beam angle variation measures to be about 19.5 arc-seconds, compared to the achieved results of ±0.018 arc-seconds, a factor of about 1000. What is also surprising is that the use of just the grating 11 alone produced a beam angle variation of about 17.3 arc-seconds, which is hardly any improvement at all. When only the prism is used, without the grating, the beam angle variation is about ±26 arc-seconds, so that the prism alone makes the wobble worse. Thus the two elements combine to produce an improvement of a factor of 1000, whereas either element alone produces no useful improvement.

While particular embodiments of the present invention have been illustrated and described, it is not intended to limit the invention, except as defined by the following claims.

I claim:

1. In a system of hologon diffraction of a laser beam to produce a scan line, the device comprising:
   a prism having a grating on at least one scan line intersecting surface and positioned at a predetermined incident angle with respect to said scan line after hologon diffraction of said laser beam, said prism adapted to refract said scan line and said grating adapted to diffract said scan line so that the refraction of said scan line by said prism is equal and opposite to diffraction of said scan line by said grating to thereby produce a scan line having bow of less that 1/600 of the bow of said scan line without said prism.

2. The device of claim 1 wherein said prism has an apex angle ranging from about 1° to about 30°.

3. The device of claim 1 wherein said prism has an apex angle ranging from about 2° to about 6°.

4. The device of claim 1 wherein said grating has grating spaces ranging from about 0.0001 to about 0.001 millimeters.

5. The device of claim 1 wherein said grating is on the incident face of said prism.

6. The device of claim 1 wherein said grating is on the exit face of said prism.

7. The device of claim 1 wherein said system is positioned to rotate as a unit about an axis.

* * * * *

UNITED STATES PATENT AND TRADEMARK OFFICE
CERTIFICATE OF CORRECTION

PATENT NO. : 5,369,526
DATED : November 29, 1994
INVENTOR(S) : Tom J. Chiang

It is certified that error appears in the above-indentified patent and that said Letters Patent is hereby corrected as shown below:

In column 1, line 36, the word "disclosed" should be --discloses--.

In column 3, line 34, the word "wherein" should be --where--.

In column 4, line 6, the phrase "so that is" should be --so that it is--.

In column 4, line 11, the word "ranges" should be --range--.

In column 5, line 8, the symbol "$\vartheta_{60}$" should be --$\vartheta_a$--.

Signed and Sealed this

Twentieth Day of August, 1996

Attest:

BRUCE LEHMAN

*Attesting Officer*       *Commissioner of Patents and Trademarks*